US007591254B2

(12) United States Patent
Machner

(10) Patent No.: US 7,591,254 B2
(45) Date of Patent: Sep. 22, 2009

(54) SUPERCHARGER CONTROL SYSTEM

(76) Inventor: Billy Machner, 75 Dakota Tr., Browns Mills, NJ (US) 08015

( * ) Notice: Subject to any disclaimer, the term of this patent is extended or adjusted under 35 U.S.C. 154(b) by 226 days.

(21) Appl. No.: 11/729,252

(22) Filed: Mar. 28, 2007

(65) Prior Publication Data

US 2008/0236162 A1 Oct. 2, 2008

(51) Int. Cl.

| | |
|---|---|
| ***F02B 33/00*** | (2006.01) |
| ***F16D 19/00*** | (2006.01) |
| ***F16D 21/02*** | (2006.01) |
| ***F16D 11/06*** | (2006.01) |
| ***F16F 15/30*** | (2006.01) |
| ***F16H 33/00*** | (2006.01) |
| ***F16H 9/00*** | (2006.01) |
| ***F16H 7/00*** | (2006.01) |
| ***F16H 9/16*** | (2006.01) |

(52) U.S. Cl. .............. 123/559.1; 123/559.3; 192/84.81; 192/84.941; 192/84.961; 192/48.8; 192/41 R; 74/574.1; 74/61; 474/5; 474/87; 474/69; 474/32

(58) Field of Classification Search ... 123/559.1–559.3; 74/574.1; 192/84.92, 69.62, 84.81, 84.941, 192/84.961; 477/5; 474/18, 74, 69, 87, 88
See application file for complete search history.

(56) References Cited

U.S. PATENT DOCUMENTS

| | | | | |
|---|---|---|---|---|
| 3,017,977 | A * | 1/1962 | Settimi et al. | 192/48.8 |
| 3,524,311 | A * | 8/1970 | Brouwer et al. | 57/299 |
| 3,865,222 | A * | 2/1975 | Briar | 192/84.81 |
| 4,194,607 | A * | 3/1980 | Yamaguchi | 192/84.81 |
| 4,273,226 | A * | 6/1981 | Takefuta et al. | 192/84.81 |
| 4,488,627 | A * | 12/1984 | Streich et al. | 192/84.961 |
| 4,793,455 | A * | 12/1988 | Tabuchi et al. | 192/84.941 |
| 5,149,225 | A * | 9/1992 | Artzberger | 74/61 |
| 5,176,580 | A * | 1/1993 | Stamm et al. | 474/101 |
| 5,342,248 | A * | 8/1994 | Matsubara et al. | 474/69 |
| 5,387,052 | A * | 2/1995 | Artzberger | 192/48.91 |
| 6,361,457 | B1 * | 3/2002 | May et al. | 474/32 |
| 7,070,526 | B2 * | 7/2006 | Lawrence | 474/87 |
| 7,216,621 | B2 * | 5/2007 | Pigott et al. | 474/903 |
| 2003/0084888 | A1 * | 5/2003 | LeBold et al. | 123/599 |
| 2003/0155205 | A1 * | 8/2003 | Shen | 192/48.5 |
| 2006/0180130 | A1 * | 8/2006 | St. James | 123/559.1 |

(Continued)

FOREIGN PATENT DOCUMENTS

JP 61105342 A * 5/1986

(Continued)

*Primary Examiner*—Thai Ba Trieu
(74) *Attorney, Agent, or Firm*—Stuart M. Goldstein

(57) ABSTRACT

A supercharger control system is installed at the bottom front end of the engine, directly onto the crankshaft. An accessory drive belt around the accessory belt pulley rotates continuously to keep vehicle accessories operating. A second belt around a larger pulley drives the supercharger blower. When the dashboard mounted switch is turned on, electricity from the engine energizes an electromagnet, which compels engagement of the rotating accessory pulley with the supercharger pulley by means of a slide plate. The belt around the supercharger pulley then rotates, operating the supercharger. If the driver does not require extra power and performance delivered by the supercharger, the switch is turned off, stopping the flow of electricity. This shuts down the magnetic field, causing the pulleys to be disengaged and disconnecting the supercharger, while still allowing the crankshaft to operate the accessories.

15 Claims, 5 Drawing Sheets

U.S. PATENT DOCUMENTS

| | | | | |
|---|---|---|---|---|
| 2007/0062498 | A1 * | 3/2007 | Woods | 123/559.1 |
| 2007/0080037 | A1 * | 4/2007 | Larry et al. | 192/21.5 |
| 2007/0095333 | A1 * | 5/2007 | Jones | 123/559.1 |
| 2008/0029361 | A1 * | 2/2008 | DeRoo et al. | 192/48.8 |
| 2008/0142332 | A1 * | 6/2008 | Koyama et al. | 192/84.961 |
| 2008/0160847 | A1 * | 7/2008 | Araki | 440/88 A |
| 2008/0173017 | A1 * | 7/2008 | St. James | 477/5 |
| 2008/0196995 | A1 * | 8/2008 | Mikami et al. | 192/41 R |
| 2008/0216598 | A1 * | 9/2008 | Roberts | 74/574.1 |

FOREIGN PATENT DOCUMENTS

| | | | |
|---|---|---|---|
| JP | 01083930 | A * | 3/1989 |

* cited by examiner

SUPERCHARGER CONTROL SYSTEM

BACKGROUND OF THE INVENTION

A supercharger is commonly installed on a vehicle internal combustion engine to provide air at high pressure into the engine's intake manifolds. The primary purpose of this added, high pressure air is to increase engine power output, i.e. engine horsepower. However, most superchargers are driven by the engine itself and, as a result, when the supercharger is operational, the engine must work harder. This causes a reduction in engine efficiency, more fuel is consumed, and there are more emissions. There is also increased wear and tear on engine components. These factors have kept superchargers off many vehicles and, for motorists who still have superchargers in use on their engines, caused them added expense for fuel and parts.

To address these problems, when an internal combustion engine is provided with a mechanical supercharging system, the supercharger blower is attached to the engine crankshaft by a supercharger clutch assembly. When the engine is operated under lower load or other conditions in which supercharging is not required, the clutch assembly is disconnected to cease operation of the supercharger. This reduces power loss resulting from supercharger operation and improves fuel economy. The supercharger stays cooler and there is less wear and tear on the engine, as well as the supercharger. When supercharging is required, the clutch assembly is engaged and the supercharger again becomes operational.

There have been prior attempts to control supercharger operation by means of mechanical and electromagnetic clutch systems. However, these prior attempts have been shown to be inefficient or problematic in actual operation. Many also involve complex mechanisms which must be integrally incorporated into the vehicle engine.

SUMMARY OF THE INVENTION

It is thus the object of the present invention to overcome the limitations and disadvantages of prior supercharger control systems.

It is an object of the present invention to provide a supercharger control system which is easily installed on the existing crankshaft of a vehicle engine to control the operation of the vehicle's supercharger.

It is a further object of the present invention to provide a supercharger control system which is easily installed on the existing crankshaft of a vehicle engine to control the operation of the vehicle's supercharger.

It is a further object of the present invention to provide a supercharger control system which is used to easily switch a vehicle supercharger off and on.

It is another object of the present invention to provide a supercharger control system which is a compact, solid mount unit, providing the driver the option of obtaining high speed engine performance when desired, and also of disconnecting the supercharger when its operation is not necessary.

It is still another object of the present invention to provide a supercharger control system which permits the driver to simply and efficiently disconnect the supercharger from operation when it is not needed, thus, increasing fuel efficiency, limiting engine exhaust emissions, and reducing wear and tear on the engine, crankshaft and other engine compartments, including the supercharger itself.

It is a further object of the present invention to provide a supercharger control system which will assist in keeping the supercharger cooler, as it will be disconnected when not being used.

These and other objects are accomplished by the present invention a compact, solid mount unit, supercharger control system configured to be installed at the bottom front end of the engine, directly onto the crankshaft of a vehicle. An accessory drive belt around the accessory belt pulley of the system rotates continuously to keep vehicle accessories (alternator, water pump, etc.) operating. A second belt around a larger pulley drives the supercharger blower. A switch mounted with the vehicle dashboard controls engine generated electrical current to the system. In order to activate the supercharger, the switch is turned on. Electric current flows to the system and energizes an electromagnet, creating a magnetic field which compels engagement of the rotating accessory pulley with the supercharger pulley by means of a slide plate. The belt around the supercharger pulley then rotates, operating the supercharger. When activated, the supercharger forces air into the engine cylinders for greater horsepower output with fuel/air explosions within the cylinders. This provides greater acceleration and top-end speed for the driver. If the driver does not require extra power and performance, the switch is turned off, stopping the flow of electric current. This shuts down the magnetic field, causing the pulleys to be disengaged and disconnecting the supercharger, while still allowing the crankshaft to operate the other accessories. In this mode, gasoline consumption is reduced and there is less exhaust being emitted. The control system of the present invention also reduces wear and tear on the crankshaft and other engine components for greater reliability and extended engine life. It also reduces stress and wear on the supercharger itself, while keeping it running cooler.

The present invention can be retrofitted into aftermarket vehicles with superchargers and also offered as standard or optional equipment with new production vehicles. It would be appealing not only to automotive performance enthusiasts, racers, and sports car owners, but also to drivers who occasionally want high performance operation from their vehicles.

The present invention can also be converted to a single pulley system which will serve to shut off power to vehicle accessories. This will create increased horsepower in the racing mode.

Novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
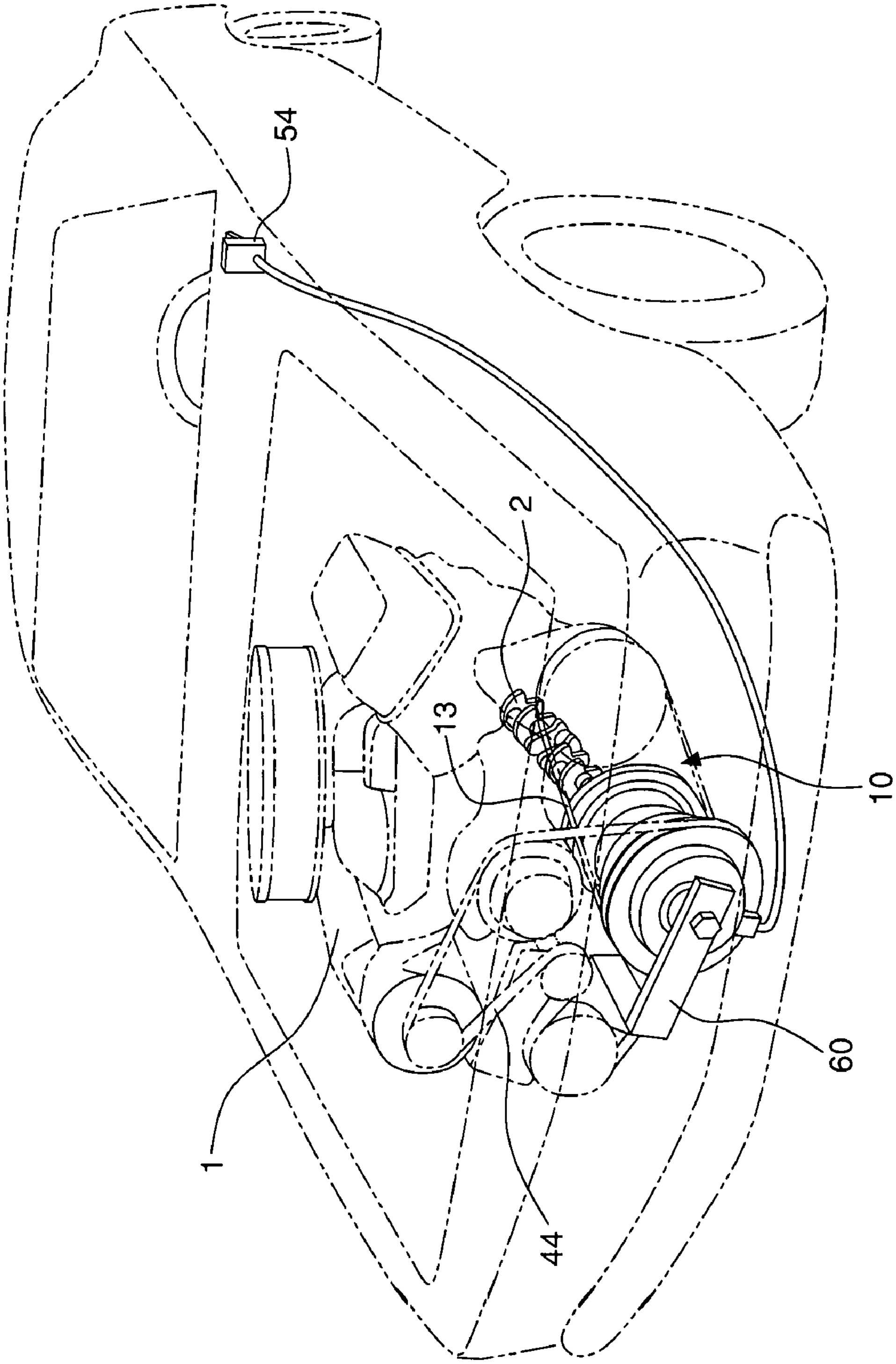
FIG. 1 is a visual representation of the supercharger control system of the present invention installed on a vehicle.
Figure 2:
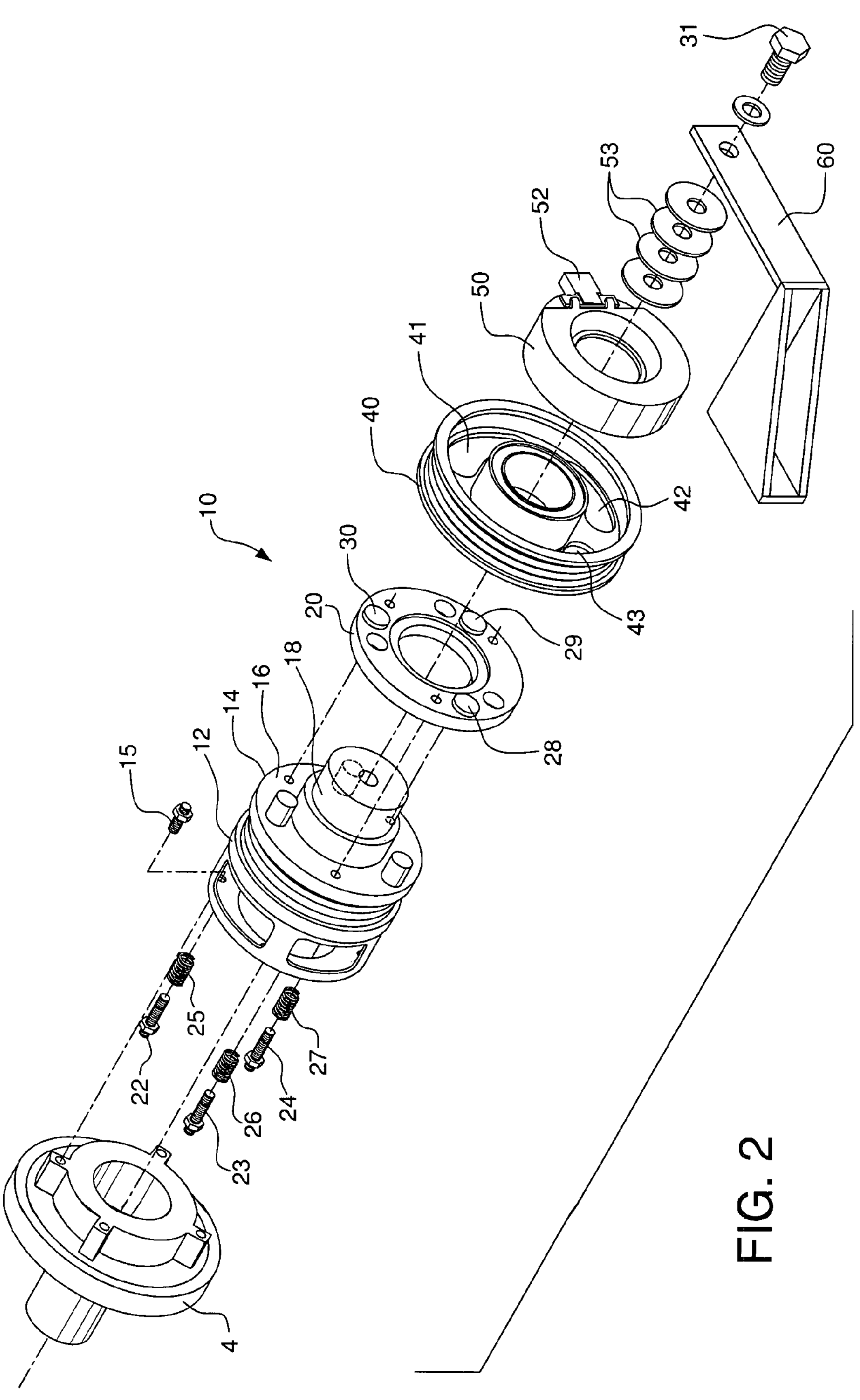
FIG. 2 is an exploded perspective view of the supercharger control system of the present invention, as it may be installed on the crankshaft of a vehicle.

Vehicle engine 1 comprises a standard crankshaft 2 connected at the bottom front of the engine to a common harmonic balancer unit 4 (not shown in FIG. 1). The other end of harmonic balancer 4 in turn is connected to the supercharger control system 10 of the present invention. Control system 10 comprises accessory crank pulley 12 which is connected, by bolts 15, to balancer 4. Power from engine 1 is transmitted from crankshaft 2, through balancer 4 to rotate accessory pulley 12. Belt 13 around accessory pulley 12 in turn rotates to operate the vehicle accessories. Accessory pulley 2 and its belt 13 are configured to rotate continuously while the engine is running.

Figure 6:
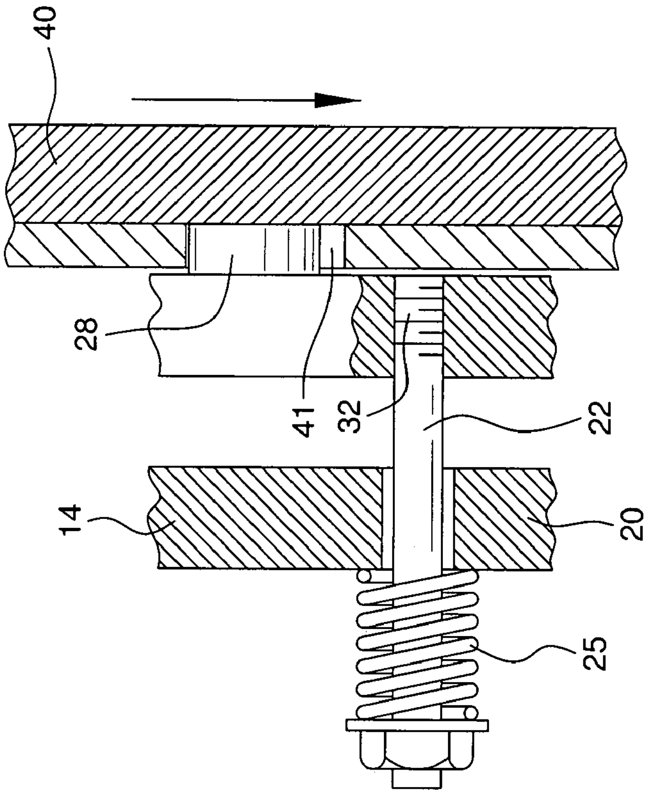
FIG. 6 is another partial elevation view of the supercharger control system of the present invention, showing the operation of the slide plate and supercharger pulley connection.
Figure 5:
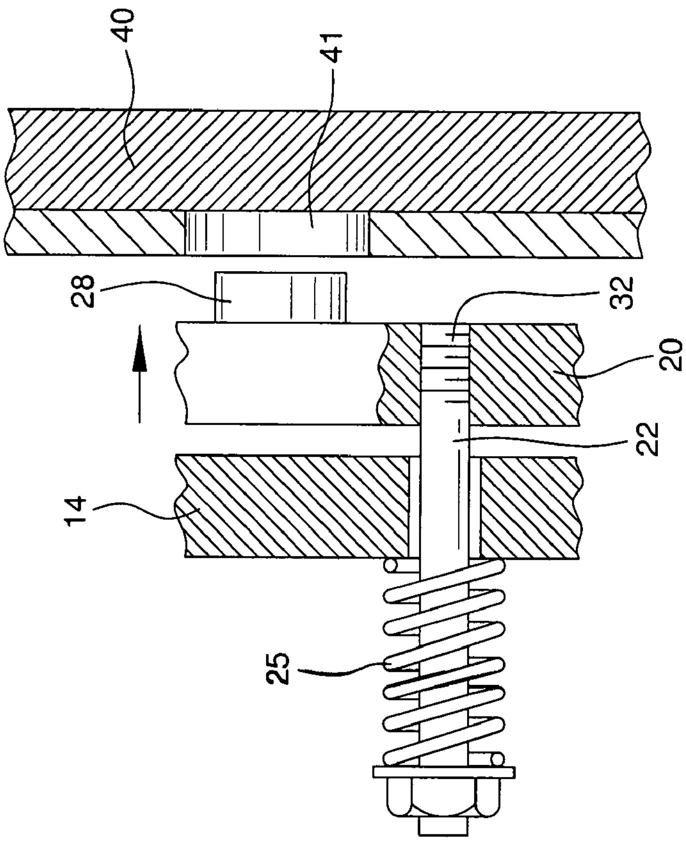
FIG. 5 is a partial elevation view of the supercharger control system of the present invention, showing the operation of the slide plate and supercharger pulley connection.

Shaft element 14, which comprises connection plate 16 and shaft 18, is connected to the outboard end of accessory pulley 12. Shaft 18 is configured to be free spinning within accessory pulley 12. Interconnection means in the form of slide plate 20 is aligned substantially parallel to accessory pulley 12 and shaft element 14. Bolt/nut connectors 22, 23, and 24, threadably secured at their ends (see, for example, threaded end 32 of bolt 22 in FIGS. 5 and 6) to slide plate 20, extend through shaft element 14, where they are secured at their other ends by bolts to accessory pulley 12. See FIGS. 5 and 6. Coil springs 25, 26 and 27 circumscribe bolts 22, 23, and 24 respectively, and apply compressive forces, maintaining shaft element 14 adjacent to slide plate 20. Bolt 31 secures all components. Tab elements 28, 29 and 30 extend from and are equidistantly spaced around the outboard surface of slide plate 20. These tabs are welded into or are similarly permanently secured onto this surface of slide plate 20. Slide plate 20 itself is made of iron or other magnetic metal.

Supercharger pulley 40 is aligned substantially parallel to accessory pulley 12 and slide plate 20. Supercharger belt 44 around supercharger pulley 40 rotates to operate the vehicle supercharger blower, when the pulley itself rotates. Supercharger pulley 40 comprises internal slots 41, 42, and 43. Tab elements 28, 29 and 30 of slide plate 20 are sized to fit into these slots and rotate within the length of the slots.

Ring element 50 is an electromagnet and constitutes the activating means for the system. It is aligned parallel to supercharger pulley 40, slide plate 20, and accessory pulley 12. Ring element 50 has electrical connection 52 for receiving electric current generated by vehicle engine 1. Switch 54, located in the vehicle, on its dashboard or other convenient location, is provided to control the electric current to ring element 50. When switch 54 is turned on electricity generated by the vehicle engine, which constitutes the means for electrically energizing ring element 50, flows to the ring element, creating an electromagnetic field around the ring element. When switch 54 turns the electricity off, ring element 50 is no longer magnetic. Appropriate washers 53 are provided for spacing and balancing the system.

Figure 3:
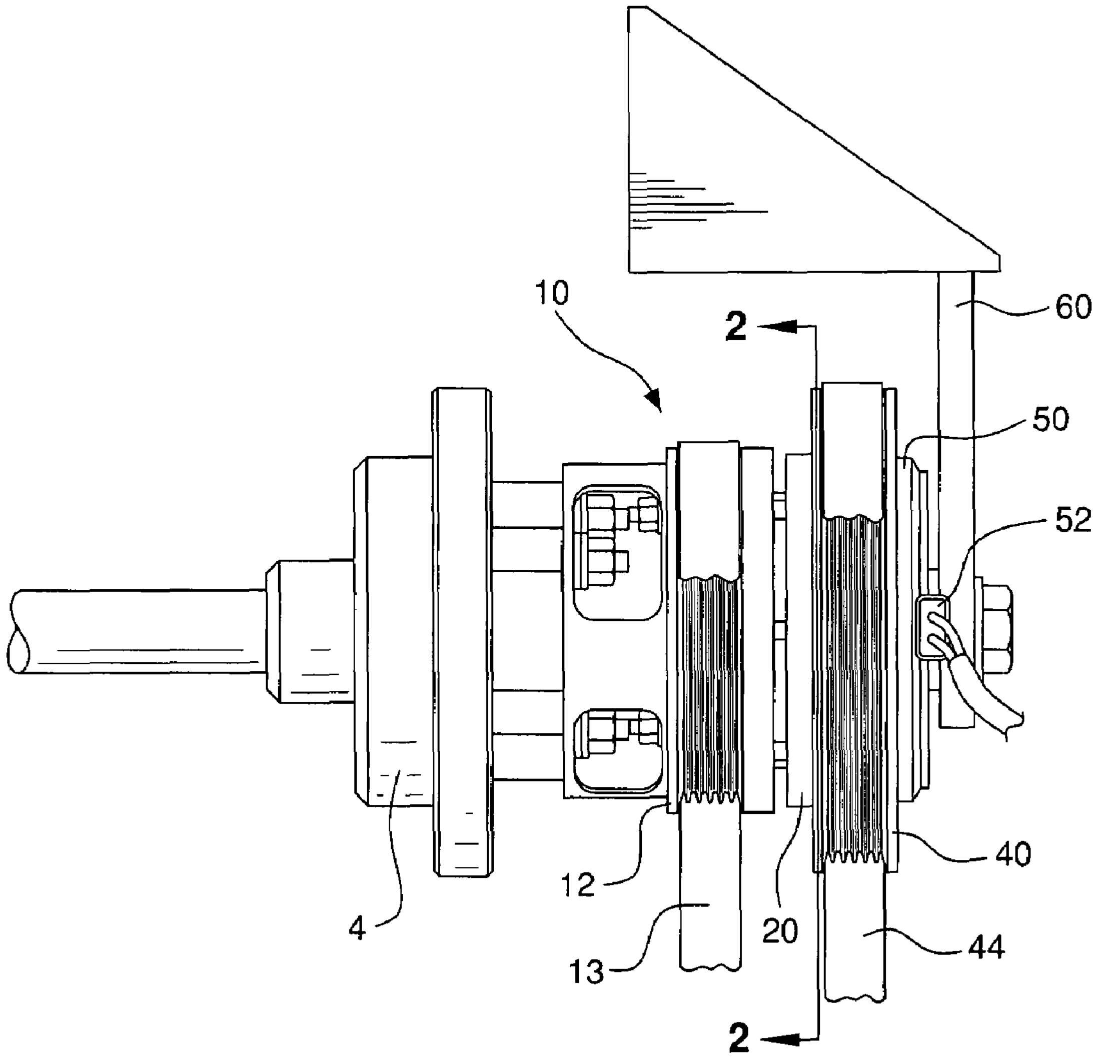
FIG. 3 is an elevation view of the assembled supercharger control system of the present invention.
Figure 4:
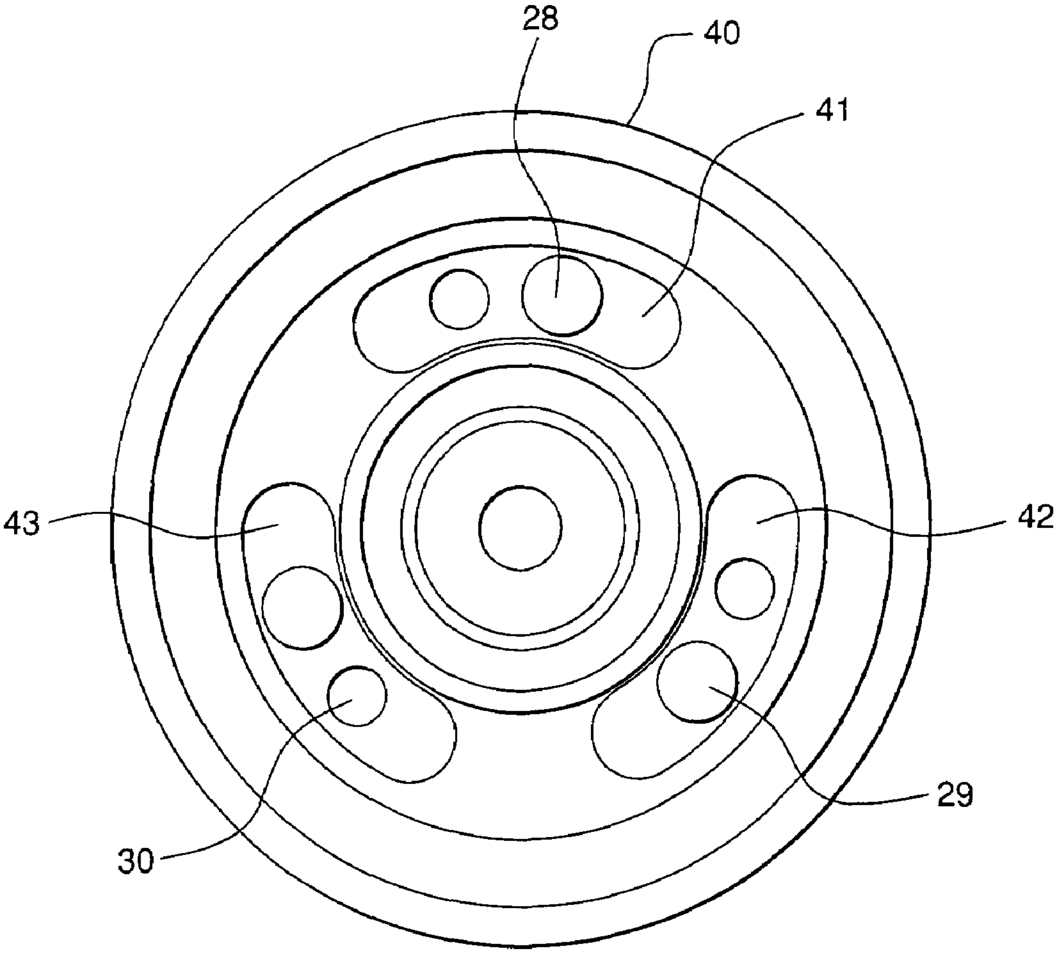
FIG. 4 is a view of the supercharger control system of the present invention taken from FIG. 3.

Supercharger control system 10, when fully assembled as seen in FIG. 3, is a compact unit mount assembly which can then easily be secured at one end to harmonic balancer 4 on engine 1 and, at its other end, to bracket 60 which supports the unit on the vehicle frame.

During engine operation, accessory pulley 12 will continually rotate, thereby rotating belt 13 to operate vehicle accessories. Slide plate 20 is attached to accessory pulley 12 such that it rotates with the pulley. During normal engine operation, springs 25, 26, and 27 retain slide plate 20 adjacent to shaft element 14, out of contact with supercharger pulley 40. See FIG. 5. Accessory pulley 12, with shaft element 14 and slide plate 20 all rotate. Supercharger pulley 40 is stationary.

In order to operate the vehicle's supercharger, supercharger pulley 40 must receive power from engine 1 and, to do this, it must be engaged with accessory pulley 12. This is accomplished by turning switch 54 on, which allows electric current generated by engine 1 to flow to electromagnet ring element 50. A magnetic field is thus created around ring element 50 and through supercharger pulley 40. The magnetic field immediately attracts metal slide plate 20 and, acting against the compressive force of springs 25, 26, and 27, slide plate 20 is pulled transversely, as shown by the directional arrow in FIG. 5, towards supercharger pulley 40. Tabs 28, 29, and 30 of slide plate 20 enter slots 41, 42, and 43 respectively of supercharged pulley 40. See FIG. 6. The tabs continue to rotate a short distance within the slots until the tabs contact the end surfaces of the slots. At this point, slide plate 20 can no longer rotate independently. Slide plate 20 has become engaged with supercharger pulley 40 and, since the plate is connected to accessory pulley 12, the rotation of that pulley is transmitted through the slide plate to supercharger pulley 40. This causes supercharger pulley 40 and its belt 44 to rotate, as shown by the directional arrow in FIG. 6, hence driving the supercharger blower itself.

When supercharger operation is no longer required, switch 54 is turned off. This ceases the flow of electricity to ring element 50, thereby canceling the magnetic field. Slide plate 20 is no longer attached to supercharger pulley 40. The biased nature of springs 25, 26, and 27 cause them to retract slide plate 20 from pulley 40, causing tabs 28, 29, and 30 to be withdrawn from pulley slots 41, 42, and 43. This action effectively disengages slide plate 20 and hence accessory pulley 12 from supercharger pulley 40, which then ceases to rotate, in turn stopping supercharger operation. The vehicle accessories continue to operate, however, since accessory pulley 12 still continues its rotation.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A supercharger control system for controlling the operation of the supercharger on a vehicle engine having a crankshaft, the supercharger being driven by the crankshaft, the control system comprising:

- a vehicle accessory belt pulley;
- a supercharger belt pulley aligned substantially parallel to the accessory belt pulley;
- an electromagnetic element aligned substantially parallel to the accessory belt pulley and the supercharger belt pulley;
- means in the form of electricity generated by the vehicle engine for electronically energizing the electromagnetic element;
- switch means to control the flow of electricity to the electromagnetic element, and
- interconnection means for engaging and disengaging the accessory belt pulley from the supercharger belt pulley, said interconnection means comprising a spring loaded slide place with outwardly extending tabs insertable into the supercharger belt pulley, whereby when the electromagnetic element is energized by the switch means to operate the supercharger, the interconnection means engages the supercharger belt pulley and the supercharger belt pulley and accessory belt pulley are engaged, and when the switch means is off and the electromagnetic element is not energized by the power means, the interconnection means is disengaged from the accessory belt pulley and the accessory belt pulley and the supercharger pulley are disengaged.

2. The supercharger control system as in claim 1 wherein when the electromagnetic element is energized, an electromagnetic field is created around the element.

3. The supercharger control system as in claim 1 wherein the electromagnetic element is aligned substantially parallel to the supercharger belt pulley.

4. The supercharger control system as in claim 1 wherein the supercharger belt pulley comprises slots.

5. The supercharger control system as in claim 4 wherein the outwardly extending tabs of the spring loaded slide plate are configured to be inserted into the slots of the supercharger belt pulley, whereby when the tabs are inserted into the slots, the accessory belt pulley and the supercharger belt pulley are engaged and upon removal of the tabs from the slots, the pulleys are disengaged.

6. The supercharger control system as in claim 1 wherein the accessory belt pulley, the supercharger belt pulley, the electromagnetic element, and the interconnection means are secured together to form a single unit assembly.

7. The supercharger control system as in claim 6 further comprising crankshaft connection means for stably attaching the unit assembly to the crankshaft of the vehicle engine.

8. A supercharger control system for controlling the operation of a supercharger on a vehicle engine having a crankshaft, the supercharger being driven by said crankshaft, the control system comprising:

first pulley means for operating vehicle accessories;

second pulley means aligned substantially parallel to the first pulley means for operating the supercharger;

interconnection means between said first and second pulley means for engaging and disengaging the second pulley means, said interconnection means comprising a spring loaded slide plate with outwardly extending tabs insertable into the second pulley means;

activating means for controlling transverse movement of the interconnection means relative to the first and second pulley means;

means in the form of electricity generated by the vehicle engine for electrically energizing the activating means, and switch means to control the flow of electricity to the activating means, whereby when the activating means is energized by the switch means to operate the supercharger and vehicle accessories, the interconnection means engages the second pulley means and the first pulley means and the second pulley means is engaged to contemporaneously operate the vehicle accessories and the supercharger, and when switch means is off and the activating means is not energized, the interconnection means is disengaged from the second pulley means, the first pulley means is disengaged from the second pulley means, and the supercharger is inoperable.

9. The supercharger control system as in claim 1 wherein the activating means comprises an electromagnet.

10. The supercharger control system as in claim 1 wherein when the activating means is energized, an electromagnetic field is created around the activating means.

11. The supercharger control system as in claim 1 wherein the activating means is aligned substantially parallel to the second pulley means.

12. The supercharger control system as in claim 1 wherein the second pulley means comprises slots.

13. The supercharger control system as in claim 12 wherein the outwardly extending tabs of the spring loaded slide plate are configured to be inserted into the slots of the second pulley means, whereby when the tabs are inserted into the slots, the first and second pulley means are engaged and upon removal of the tabs from the slots, the first and second pulley means are disengaged.

14. The supercharger control system as in claim 1 wherein the first pulley means, the second pulley means, the activating means, and the interconnection means are secured together to form a single unit assembly.

15. The supercharger control system as in claim 14 further comprising crankshaft connection means for stably attaching the unit assembly to the crankshaft of the vehicle engine.

* * * * *